United States Patent
Lequien et al.

(10) Patent No.: US 9,682,881 B2
(45) Date of Patent: Jun. 20, 2017

(54) METHOD FOR PRODUCING A GLASS CONTAINER BY PRESSING

(71) Applicant: POCHET DU COURVAL, Paris (FR)

(72) Inventors: Jany Lequien, Hodeng au Bosc (FR); Pascal Froissart, Neuville Coppegueule (FR); Sébastien Baliteau, Boutencourt (FR)

(73) Assignee: POCHET DU COURVAL, Paris (FR)

( * ) Notice: Subject to any disclaimer, the term of this patent is extended or adjusted under 35 U.S.C. 154(b) by 0 days.

(21) Appl. No.: 14/896,592

(22) PCT Filed: Jun. 5, 2014

(86) PCT No.: PCT/FR2014/051345
§ 371 (c)(1),
(2) Date: Dec. 7, 2015

(87) PCT Pub. No.: WO2014/195644
PCT Pub. Date: Dec. 11, 2014

(65) Prior Publication Data
US 2016/0122223 A1 May 5, 2016

(30) Foreign Application Priority Data

Jun. 6, 2013 (FR) .................................... 13 55239

(51) Int. Cl.
*C03B 11/10* (2006.01)
*C03B 11/12* (2006.01)
(Continued)

(52) U.S. Cl.
CPC ............... *C03B 11/10* (2013.01); *B65B 7/28* (2013.01); *C03B 9/1932* (2013.01); *C03B 11/127* (2013.01)

(58) Field of Classification Search
CPC ...... C03B 11/10; C03B 11/127; C03B 9/1932
See application file for complete search history.

(56) References Cited

U.S. PATENT DOCUMENTS

| 3,458,382 A | 7/1969 | Buck |
| 3,468,648 A * | 9/1969 | Nowak ................. C03B 9/1932 |
| | | 215/400 |

(Continued)

FOREIGN PATENT DOCUMENTS

| DE | 19641173 A1 | 4/1998 |
| DE | 102006058770 B3 * | 4/2008 ............. C03B 11/10 |

(Continued)

OTHER PUBLICATIONS

PCT International Search Report and Written Opinion for PCT/FR2014/051345, mailed Nov. 11, 2014, 10 pgs.

(Continued)

*Primary Examiner* — Erin Snelting
(74) *Attorney, Agent, or Firm* — Patterson Thuente Pederson, P.A.

(57) ABSTRACT

A method for producing a glass container by: a) providing a forming vessel, and b) providing a forming die comprising an outer surface, c) placing the forming die in the forming vessel, in a forming position, in which a receiving space is defined between the inner surface of the forming vessel and the outer surface of the forming die, a deformable glass gob extending partially into the receiving space, d) cooling the deformed glass gob while keeping the glass gob in the forming position in the forming vessel and the forming die, and then e) retracting the forming die.

19 Claims, 2 Drawing Sheets

(51) Int. Cl.
*C03B 9/193* (2006.01)
*B65B 7/28* (2006.01)

(56) References Cited

U.S. PATENT DOCUMENTS

| | | |
|---|---|---|
| 4,072,491 A | 2/1978 | Kramer et al. |
| 5,687,862 A | 11/1997 | Barbier et al. |
| 6,440,354 B1 | 8/2002 | Takai et al. |
| 8,333,287 B2 | 12/2012 | Lonsway et al. |
| 8,869,563 B2 | 10/2014 | Froissart et al. |
| 9,145,321 B2 | 9/2015 | Froissart et al. |
| 2003/0026924 A1 | 2/2003 | Fait et al. |
| 2009/0084799 A1* | 4/2009 | Mondon ............... C03B 9/1932 220/674 |
| 2012/0304698 A1* | 12/2012 | Froissart ............... B44B 5/0004 65/80 |
| 2013/0081427 A1 | 4/2013 | Danabalan |
| 2013/0082065 A1* | 4/2013 | Danabalan ............ C03B 40/02 220/602 |
| 2013/0145797 A1 | 6/2013 | Lequien et al. |

FOREIGN PATENT DOCUMENTS

| | | |
|---|---|---|
| EP | 0 561 157 | 9/1993 |
| EP | 1 656 859 A2 | 5/2006 |
| FR | 483 945 A | 8/1917 |
| FR | 1 344 185 A | 11/1963 |
| FR | 2 153 382 A1 | 5/1973 |
| FR | 2 795 714 A1 | 1/2001 |
| FR | 2 881 421 A1 | 8/2006 |
| FR | 2 966 453 A1 | 4/2012 |
| FR | 2 975 988 A1 | 12/2012 |
| GB | 1 441 771 | 7/1976 |
| JP | S 60145918 A | 8/1985 |
| JP | S 62 12623 A | 1/1987 |
| JP | H 08175824 A | 7/1996 |
| JP | 2003/095671 A | 4/2003 |
| WO | WO 2009/042171 A1 | 4/2009 |

OTHER PUBLICATIONS

English translation of PCT International Search Report for PCT/FR2014/051345, mailed Nov. 11, 2014, 3 pages.
Preliminary Search Report and Written Opinion for FR application No. 13/55,239, dated Jan. 24, 2014, 7 pages.

* cited by examiner

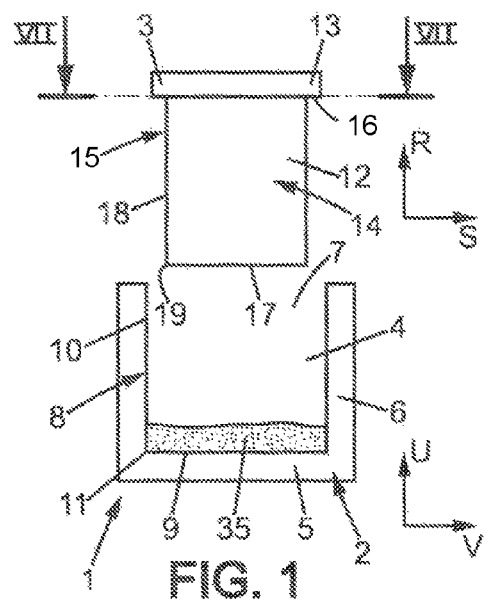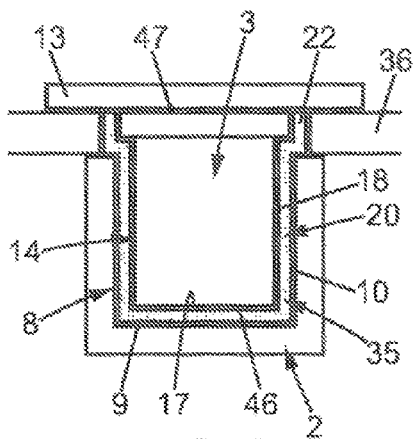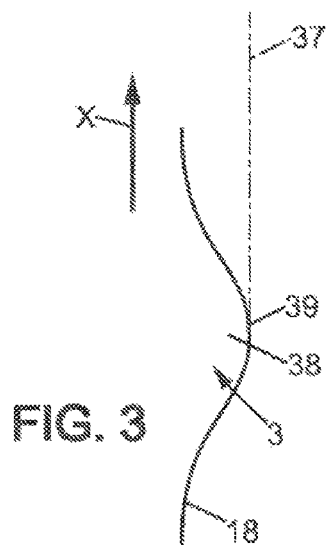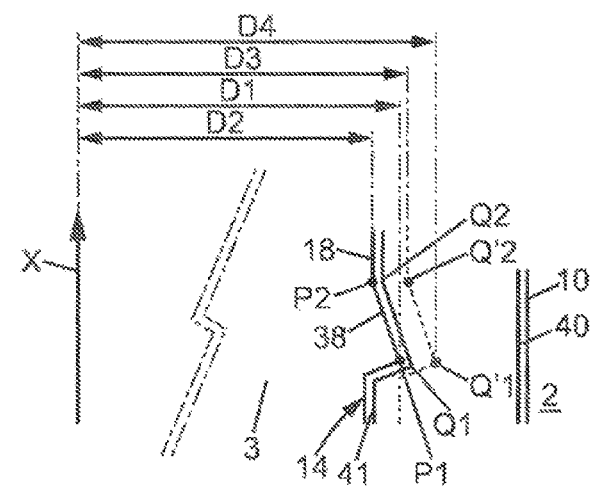

METHOD FOR PRODUCING A GLASS CONTAINER BY PRESSING

RELATED APPLICATIONS

The present application is a National Phase entry of PCT Application No. PCT/FR2014/051345, filed Jun. 5, 2014, which claims priority from FR Patent Application No. 13 55,239, filed Jun. 6, 2013, said applications being hereby incorporated by reference herein in their entirety.

FIELD OF THE INVENTION

The invention relates to the field of processes for the manufacture of glass containers.

More specifically the invention relates to the field of processes for manufacturing glass containers by pressing.

BACKGROUND OF THE INVENTION

A blowing technique, in which the shape of the container is achieved by blowing a hot gas into a deformable gob of molten glass in order to impart a given shape to it, is normally used for manufacturing glass containers.

For various reasons a pressing process in which the deformable molten glass is placed in a molding cavity defined by a die and a punch and adopts the shape of that cavity can be preferred to this blowing process for a variety of reasons. In particular the pressing process makes it possible to manufacture wide-mouthed containers.

One of the difficulties associated with the pressing process lies in the difficulty of producing a variety of internal shapes for the container. These internal shapes may be used to personalize the container, and to give it a strong identity. Another advantage is that containers having the same external appearance but differing in internal volume can readily be produced. Another advantage may for example also be to produce a container whose shape is optimized for its operating conditions using less material, and thus at lower cost. An internal shape may for example be produced in locations where the mechanical strength of the container is largely sufficient. Making such shapes may be difficult, because owing to the fact that the die must be removed from the forming vessel it is preferable for the die to be of a tapering or cylindrical shape in order to avoid any risk of damaging the glass when the die is removed.

One example of an embodiment which makes it possible to produce shapes in relief within a jar is to produce grooves which extend along the axis along which the die is removed. In such a situation the glass material which is being shaped does not prevent the die from being removed.

In order to form a relief within a container using a molding process it is necessary to use a punch comprising a movable system, as is for example suggested in FR 2 975 988. This punch can adopt two configurations, one in which the marking portion prints the relief, but in which the punch cannot be removed, and one in which the marking portion is retracted so that the punch can be removed.

Although such a process is of great advantage, in particular for forming deep interior shapes within a jar, practical implementation is limited because of the extremely high temperatures to which the system is subjected, which give rise to difficulties in the manufacture of a movable system which is reliable over time.

Yet another option is to remove the punch by screwing. Such screwing is described in FR 2 153 382. In this embodiment the punch is withdrawn through a helical movement, which makes it possible to form a helical shape in relief within a jar. One of the limitations of this embodiment is however that it can only be used to form helical shapes.

By way of anecdote mention may also be made of U.S. Pat. No. 4,072,491, which describes the manufacture of a "helical" shape by axial withdrawal of the punch. This is in fact a false helix, without zones of glass material which are likely to prevent axial withdrawal of the die, which is only possible because of the highly tapering shape of the inside wall of the jar. The helix is therefore made in the tapering wall of the container, but the outer wall of the container narrows uniformly between these two extremities.

This document provides a method for producing glass containers by pressing which makes it possible to use many possible forms of internal relief without resorting to mechanisms which are exposed to very high temperatures.

SUMMARY OF THE INVENTION

A description of the invention as characterized in the claims follows.

According to a first aspect the invention relates to a process for producing a glass container by pressing comprising:
a) providing a die having an internal surface which is intended to shape the outer surface of a wall of the container,
b) providing a punch comprising an external surface which is intended to shape an internal surface of the wall of the container,
c) placing the punch within the die in a forming position in which a receiving space is defined between the inner surface of the die and the outer surface of the punch, a deformable gob of glass extending partly within the receiving space, the punch being capable of being moved with respect to the die in a withdrawing movement between the forming position and a withdrawn position, a volume envelope being defined by the cumulative volume occupied by the punch between its forming and withdrawn positions,
d) while keeping the gob of glass within the die and the punch in the forming position, the gob of glass which is deformed between an initial state having an initial volume and a subsequent state having a subsequent volume is cooled, the initial volume intercepting the volume envelope, and the subsequent volume not intercepting the volume envelope,
e) extracting the punch.

Thanks to these arrangements the molding process is controlled in such a way that shrinkage of the glass makes it possible to withdraw the punch after a certain amount of cooling, whereas such withdrawal when hot would disturb the internal geometry in relief.

In accordance with one embodiment, during stage c) a deformable gob of glass is placed in the die, the punch is moved in an inward movement from an initial position to the forming position, thus deforming the deformable gob of glass to cause the latter to expand partly within the receiving space.

In accordance with one embodiment the initial position and the withdrawn position are the same.

In accordance with one embodiment, the inward and withdrawal movements follow opposing trajectories.

According to one embodiment the withdrawal movement is a purely translational movement along a withdrawal axis.

According to one embodiment the die comprises a base and an opposite opening in which the punch extends between a first extremity and a second opposite extremity along the withdrawal axis, the first extremity being located closer to the base of the die than the second extremity, in which in a plane of transverse cross-section comprising the withdrawal axis, the external surface of the punch comprises a first point close to the first extremity and a second point at a distance from the first extremity, in which a distance from the first point to the withdrawal axis is greater than a distance from the second point to the withdrawal axis.

In accordance with one embodiment the gob of glass has an internal surface facing the outer surface of the punch, when in its initial volume as when in its subsequent volume, the inner surface of the gob of glass having a first point associated with the first point on the outer surface of the punch and a second point associated with the second point on the outer surface of the punch and in the subsequent state a distance from the second point of the inner surface of the gob of glass to the withdrawal axis is greater than the distance from the first point of the outer surface of the punch to the withdrawal axis.

In accordance with one embodiment the second point on the inner surface of the glass gob is the point closest to the withdrawal axis of the inner surface of the gob of glass in the said transverse cross-sectional plane.

In accordance with one embodiment, in its initial state the gob of glass has an inner surface facing the outer surface of the punch and an outer surface opposite the inner surface, the outer surface of the gob of glass facing the inner surface of the die, in stage d) applying cooling to the gob of glass which differs between the inner and outer surfaces of the gob of glass.

In accordance with one embodiment the outer surface of the gob of glass is cooled more than the inner surface.

In accordance with one embodiment, in stage d) the gob of glass is cooled in a controlled way in such a way as to keep the outer surface of the gob of glass on the inner surface of the die.

In accordance with one embodiment, in stage d) the gob of glass is cooled in a controlled way in such a way that the inner surface of the gob of glass is detached from the outer surface of the punch.

In accordance with one embodiment, in stage d) a gas, in particular air, is introduced between the inner surface of the gob of glass and the outer surface of the punch.

In accordance with one embodiment, in stage d) the gob of glass is cooled simultaneously by the die and the punch.

In accordance with one embodiment, f), finishing operations are carried out in order to produce a glass container.

In accordance with one embodiment, after the punch has been withdrawn, g), a stage of blowing is used to deform the wall.

In accordance with one embodiment, h), the vessel is filled with contents and the container is removably closed using a closure which acts together with the container and which can alternately be placed in a closed position in which it prevents access to the contents and an open position in which it allows such access.

In accordance with one embodiment the container and the closure acting together with the latter form one article, and i) finishing operations are applied to the article.

BRIEF DESCRIPTION OF THE DRAWINGS

The figures in the drawings will now be briefly described.

FIG. 1 is a diagram corresponding to a transverse cross-section in a mold which may be used in the context of the invention.

FIG. 2 is a view corresponding to that in FIG. 1 in the forming position for the punch.

FIG. 3 is a detailed view of the outer surface of the punch, in the same transverse cross-section as in FIGS. 1 and 2.

FIG. 4 is a detailed view similar to FIG. 3 for a variant embodiment.

DETAILED DESCRIPTION OF THE DRAWINGS

There follows a detailed description of several embodiments of the invention provided with examples and reference to the drawings.

In the figures the same reference numbers describe identical or similar elements.

FIG. 1 shows a mold 1 for the manufacture of a glass container by pressing. Mold 1 comprises a die 2 and a punch 3. Mold 1 defines a cavity 4 (receiving space) lying between die 2 and punch 3.

Figure 5:
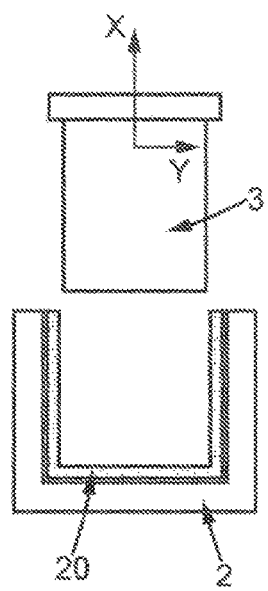
FIG. 5 is a view corresponding to FIGS. 1 and 2 in the withdrawn position of the punch.

In FIG. 1 mold 1 is shown in an open configuration. That is to say that the punch is located in an initial position with respect to the die. Punch 3 and die 2 can move in relation to each other. To make things clear it will henceforth be considered that die 2 is fixed and that punch 3 can move with respect to die 2. Punch 3 can move with respect to die 2, on the one hand between an initial position shown in FIG. 1 and a forming position shown in FIG. 2 and also between the forming position shown in FIG. 2 and a withdrawn position shown in FIG. 5. To make things clear the punch has been shown above the die, but as a variant the process may be carried out in a reverse orientation. That is to say with the mold upside-down, having an opening at the base for the introduction of a molten gob of glass, and the punch being located beneath the mold.

Where appropriate the initial position shown in FIG. 1 and the withdrawal position shown in FIG. 5 are the same, so that movement of punch 3 can be repeated periodically to form a plurality of glass containers in a successive fashion. Punch 3 undergoes an insertion movement between its initial position shown in FIG. 1 and its forming position shown in FIG. 2. Between its forming positions shown in FIG. 2 and its withdrawn position shown in FIG. 5 the punch undergoes a withdrawal movement. The trajectories of these movements may if appropriate be opposite. That is to say that the positions adopted by punch 3 during its inward movement and during its withdrawal are the same, the order in which these positions are adopted being the opposite.

Die 2 is in the form of a container which can receive a molten gob of glass. Thus die 2 can withstand temperatures of the order of approximately 600° C. to 1200° C. Die 2 may have any appropriate shape. In the relatively simple example illustrated, die 2 comprises a base 5 and a peripheral side wall 6 extending from base 5. The peripheral side wall has an upper opening 7 opposite to the base. Die 2 has an inner surface 8 which is designed to shape an outer surface of a wall of the container. Inner surface 8 comprises an internal base surface 9 and an internal peripheral side wall surface 10. In the example illustrated, these two internal surfaces are connected together by a corner 11. This however is purely illustrative.

The inner surface of base 9 has any appropriate shape. The inner surface of peripheral side wall 10 has any appropriate shape. For example the inner surface of peripheral side wall 10 may have a cylindrical shape along a die axis U. As a variant provision may be made for a frustoconical inner surface tapering in the direction of base 5. In a cross-section transverse to the U axis, the inner surface of peripheral side wall 10 may have any appropriate shape. For example, in the example illustrated, which is purely illustrative, provision is made for a hexagonal shape. This cross-section may be constant and continuous along the U axis, or may for example be homothetic along the U axis in relation to a central point located within the inner surface of peripheral side wall 10.

As a variant peripheral side wall 10 may have a different geometry, which is suitable for generating shapes in relief on the outer surface of the container wall, through the use of drawers, or by other means.

Punch 3 takes the form of a projection capable of shaping a molten gob of glass. Thus punch 3 can withstand temperatures of the order of approximately 1000° C. Punch 3 may have any appropriate shape. On the macroscopic scale, punch 3 comprises a body 12 and a cover 13. Punch 3 has an outer surface 14 which is intended to shape an inner surface of a container wall. Outer surface 14 comprises a body outer surface 15 and a cover outer surface 16. The body outer surface 15 itself has a base outer surface 17 and a peripheral outer side wall surface 18. In the example illustrated, these two outer surfaces are connected together by an edge 19. This however is purely illustrative.

Base outer surface 17 may have any appropriate shape. The outer surface of peripheral side wall 18 will be described in greater detail below on the macroscopic scale, that is to say seen from afar on the scale of the dimensions of the container, without taking into account the local shapes which are the objects of the invention which will be described in greater detail below. For example, on the scale of the container's dimensions, provision is made for the outer surface of peripheral side wall 18 to have a cylindrical shape along a punch axis R. As a variant, provision may be made for a frustoconical outer surface tapering in the direction of the base outer surface 17, for example with an angle of tapering of the order of 2° to 10°. In cross-section transverse to the R axis, the outer surface of peripheral side wall 18 has any appropriate shape. For example, in the example illustrated, which is purely illustrative, provision is made for an octagonal shape. This cross-section may be continuous and constant along the R axis, or for example homothetic along the R axis in relation to a central point located within the outer surface of peripheral side wall 18.

Container 20 which has to be formed generally comprises a main body 21 and an annular portion 22. Main body 21 has a hollow shape designed to contain contents, in particular liquid or paste contents, for example of the type of a cosmetic product (perfumes, powder, etc.). Annular portion 22 is integral with main body 21 and defines an opening 23 through which the contents may be inserted or withdrawn, and a closure interface enabling container 20 to cooperate with a lid 24. It will be noted here that the invention mainly relates to the manufacture of the principal body 21 of container 20. As a consequence, it is this manufacture which will be described in greater detail below. Annular portion 20 may be manufactured according to any appropriate means, and a purely illustrative example will be illustrated below in greater detail.

As may be seen from FIG. 1, die 2 and punch 3 act together to define a cavity 4 of a shape defining the shape of container 20. In this respect, the inner surface 8 of the die 2 and outer surface 14 of punch 3 define the shape of container 20. In the example illustrated, container 20 comprises a base 25 and a peripheral side wall 26 attached to the base. Container 20 comprises an outer surface 27 and an opposite inner surface 28. Thus outer surface 27 comprises an outer base surface 29 and an outer peripheral side wall surface 30. These two outer surfaces of base 29 and peripheral side wall 30 are if appropriate connected together by an edge 31. Inner surface 28 comprises a base inner surface 32 and an inner peripheral side wall surface 33. These two base and peripheral side wall inner surfaces 32, 33 are if appropriate connected together by an edge 34. The outer surface 29 and inner surface 32 of the base are opposite to each other and define base 25, and the outer surface 30 and inner surface 33 of the peripheral side surface are opposite each other and define peripheral side wall 26.

In the forming position, illustrated in FIG. 2, punch 3 and die 2 are associated together to define the shape of container 20. In particular the outer surface 14 of punch 3 is opposite and at a distance from inner surface 8 of die 2. Thus the outer surface of base 17 of punch 3 faces the inner surface of base 9 of die 2. The outer surface of peripheral side wall 18 of punch 3 is opposite the inner surface of peripheral side wall 10 of die 2. In this forming position, a deformable gob of molten glass 35 is deformed in such a way as to extend between punch 3 and die 2. The material which has to be shaped has an expansion coefficient of the order of $90 \cdot 10^{-7 \circ}$ $C.^{-1}$. Gob of glass 35 fills cavity 4 and matches inner surface 8 of die 2 and outer surface 14 of punch 3. The thickness between inner surface 8 and outer surface 14 is for example at least 2 mm, preferably at least 2.5 mm, depending upon the dimensions of the container being formed. It will be noted that if appropriate annular portion 22 of the container may also be made by any appropriate means, for example by using a dedicated portion of mold 36 which can be moved in relation to die 2 along a transverse axis S, which is for example radial. Cover 13 of punch 3 acts together with die 2 or the portion of mold 36 to close off cavity 4.

Punch 3 is held in the forming position for a certain length of time during which the temperature of deformed glass gob 35 falls. The time required depends on the weight of the glass and the depth of the shape which has to be formed, that is typically of the order of between 2 and 30 seconds. After a certain period of time a withdrawal movement is applied to the punch to place punch 3 in its withdrawn position shown in FIG. 5. To make things clear, in the remainder of the description, an extraction movement which is a purely translational movement of punch 3 in relation to die 2 along a withdrawal axis X will be considered. In the present case the axes X, R 5 and U are the same. In the forming position, the punch has a first extremity 46 facing base 5 of die 2, and a second opposite extremity 47. First and second extremities 46, 47 are located in that order along withdrawal axis X. Thus after a certain time in the forming position, punch 3 undergoes a withdrawal movement from its forming position to the external position shown in FIG. 5.

A volume envelope 37 for punch 3 can be defined as the cumulative volume occupied by punch 3 between its forming and external positions. That is to say that if at any instant in the movement of punch 3 from its forming position to its external position, punch 3 will occupy a given point in space, then this point in space will be part of the volume envelope. For clarity, the explanations given hereafter relate to a transverse cross-section in the plane containing the withdrawal axis. These explanations could apply to any other plane containing the withdrawal axis, even if the geometries in these different planes were not precisely the same. As may be seen in FIG. 3, the outer surface of peripheral side wall 18 of punch 3 includes a projection 38. As may be seen in FIG. 3, projection 38 comprises a point 39 which is more radially external in relation to axis X. Thus in this plane, volume envelope 37 comprises a straight line parallel to the X axis passing through this radially outermost point 39.

With reference to FIG. 4, it will be understood that a projection 38 comprises a point P1 which is radially more external in relation to the X axis and a point P2 which is subsequent from base surface 17 (or first extremity 46) of punch 3 and closer to the X axis than point P1. Thus a distance D1 from point P1 on the X axis is greater than the distance D2 from point P2 to the X axis.

At the very start of the forming stage, when punch 3 is located in its forming position, hot molten glass 35 deforms to match both the outer surface of peripheral side wall 18 of punch 3 and the inner surface of the peripheral side wall of die 2. Thus at this moment an inner wall of the glass container comprises a point Q1 which is the same as point P1 and a point Q2 which is the same as point P2. Thus in this initial condition of the deformed glass gob, the deformed gob has an initial volume which intercepts volume envelope 37 of punch 3. In fact, point Q2 is located radially more internally than point P1 in relation to the X axis. If punch 3 were to be withdrawn in this initial condition, it would draw the glass directly over projection 38. This would damage punch 3, and would not achieve the intended aim of forming a shape in relief on container 20.

While punch 3 is held in its forming position, the molten gob of glass cools, because die 2 and punch 3 are at a lower temperature than molten glass gob 35. During this cooling, shrinkage of the glass takes place. In particular, differential cooling is applied to the inner and outer surfaces of the glass gob. Outer surface 40 of the glass gob which is intended to form outer surface 27 of the container faces inner surface 8 of die 2. Inner surface 41 of the glass gob intended to form inner surface 28 of the container faces outer surface 14 of the punch. By applying differential cooling to these two surfaces, outer surface 40 of the glass gob is held on inner surface 10 of die 3. Inner surface 41 of the glass gob becomes detached from outer surface 14 of punch 3. The differential cooling is achieved by controlling the temperatures of punch 3 and die 2. Die 2 has a larger exchange surface area with the molten glass gob and can be held with an inner surface at a controlled temperature around 400° C. to 600° C. The exterior of die 2 is held at a very much lower temperature, for example of the order of 100° C. to 300° C. Thus there is significant heat flow across die 2.

Punch 3, which has been inserted into the heart of the molten glass gob, is held at a temperature lower than the inner surface of the die. The outer surface of the punch is for example held at between 300° C. and 500° C. The temperature of the punch is lower than the temperature of the inner surface of die 2. During this detachment, unless working under vacuum, a gas, such as ambient air, may come to lie between inner surface 41 of the gob of glass and outer surface 14 of punch 3. Thus in a subsequent condition of the glass gob obtained after a certain time with forming die 3 in the forming position, this is shown using dotted lines in FIG. 4. In this subsequent condition, outer surface 40 of the gob of glass may not have significantly changed its position, such that the solid line shown for the initial state also corresponds to the location of this part in the subsequent state. Conversely the position of inner wall 41 of the gob of glass in this subsequent state has changed. Thus, in relation to the X axis, it may be considered that point Q1 has moved radially outwards to Q'1 and that point Q2 has moved outwards to a point Q'2. This shrinkage is for example of the order of between 0.05 mm and 0.5 mm for the types of containers considered here. In this subsequent condition, the gob of glass has a subsequent volume. The subsequent volume does not intercept volume envelope 37. In particular, as may be seen in FIG. 4, distance D3 from point Q'2 to the X axis is greater than the distance D1 from point P1 to the X axis. Thus in this subsequent condition, it is possible for punch 3 to be withdrawn without interfering with inner surface 41 of the gob of glass and consequently with the gob of glass itself. Furthermore, as the shrinkage affects all peripheral side wall 26, distance D4 from point Q'1 to the X axis remains greater than distance D3 from point Q'2 to the X axis. In other words a space, or a negative hollow shape, has been made in inner surface 33 of peripheral side wall 20 of container 10.

Container 20 can then be withdrawn from die 2 by any appropriate means.

The formation of annular portion 20 has not been specifically described here; this may be achieved in any appropriate manner compatible with the invention. According to one embodiment of the invention, a glass container is produced. Different stages of finishing may be applied to this glass container, such as deposited coatings, for example. Container 20 formed in this way may be filled with contents. A closure 24 may be assembled on container 20 to form an article ready to be packaged and delivered or sold. Closure 24 acts together with container 20 in a removable way, and may alternately be placed in a closed state in which it prevents access to the contents and an open state in which it permits such access. Closure 24 is held on the glass container by screwing, pressure or otherwise.

The embodiment described above makes reference to a withdrawal movement which is a purely translational movement of punch 3 along an axis X. However the invention is not limited to this particular type of movement. This particular movement has been used to describe the invention, to aid understanding. Other types of movements for withdrawing the punch can be envisaged, starting from a time when the initial volume intercepts the volume envelope, and the subsequent volume does not intercept the volume envelope. It will thus be noted that in the case of withdrawal movement through screwing, as for example described in the prior art cited above, the volume envelope of the punch corresponds precisely to the shape of the screw of the punch in its forming position. Thus for this type of prior processes, the initial volume does not intercept the volume envelope.

Figure 6:
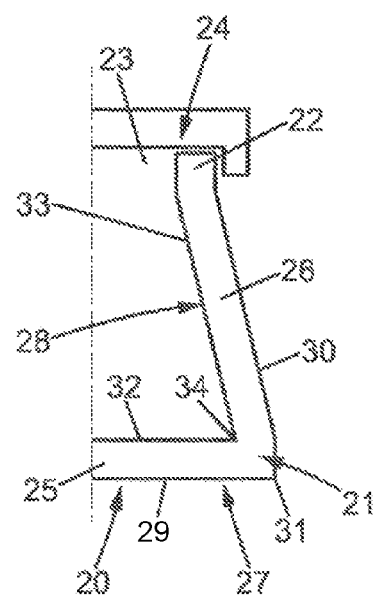
FIG. 6 is a deformed view in cross-section of a jar produced in accordance with a process such as that described in this patent application.

The invention has also been described above with reference to the formation of a relatively local projection 38 on the outer surface 14 of punch 3. However such a projection is not necessarily localized. Thus FIG. 6 shows an embodiment of a jar in which the shape of the inner surface of peripheral side wall 33 widens continually on approaching base 25 of container 20. It will however be noted that the embodiment in FIG. 6 is not necessarily to scale, and that the widening in the direction of the base may have been enlarged to improve understanding of the invention.

Figure 7:
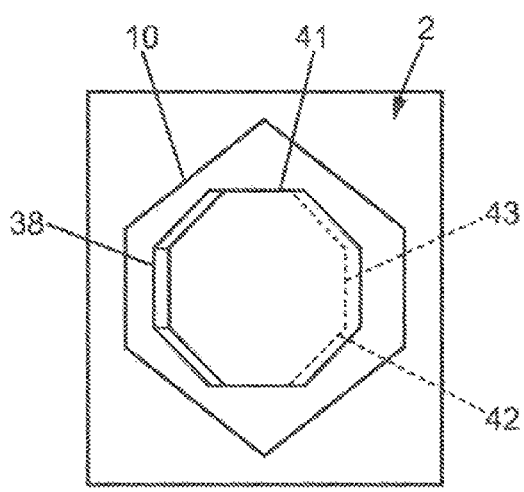
FIG. 7 is a view from above of the mold in FIG. 1.

The above invention has been described in relation to a particular cross-sectional plane through punch 3. A punch 3 which is profiled on its periphery so that any transverse cross-section comprising the R axis has the same shape as that which has just been described might be used. As a variant, the invention could be implemented to make more complex shapes within container 20. A purely illustrative example is shown in FIG. 7, which shows both upper peripheral wall 41 and lower peripheral wall 42 of punch 3. In a purely illustrative way a projection 38 of punch 3 may therefore be noted on the left-hand side of FIG. 7 and a non-cylindrical hollow form 43 of the punch on the right. This example is purely illustrative.

The container which has just been manufactured, as a result of the pressing process described above, may be used as such, subject to a few finishing stages. In this case only a pressing process is involved.

Figure 8:
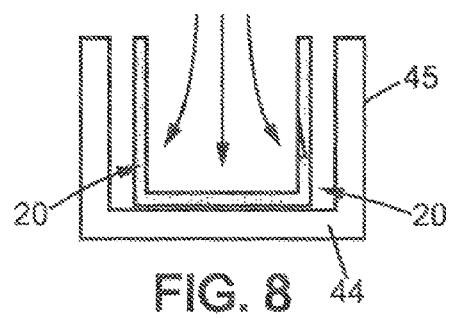
FIG. 8 is a simplified diagram of a subsequent blowing stage.

As a variant a process known as pressing/blowing in which the process described above corresponds to the pressing stage in the pressing/blowing process may be used. In this case the container originating from the pressing process which has just been described is then subjected to a blowing process. During this blowing process, container 20 is placed in a blowing vessel 44. Blowing vessel 44 comprises an inner surface 45 having any appropriate geometry. Container 20 is subjected to a flow of air which radially displaces its walls to press them against inner surface 45 of blowing vessel 44 so that container 20 takes the shape imparted by that surface. This stage is described diagrammatically in FIG. 8. It should be noted that during this blowing process the general hollow shape generated in the inner surface of container 20 will remain a hollow shape.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for producing a glass container by pressing, wherein the method comprises:
   a) providing a die having an internal surface which is intended to shape an outer surface of a wall of the container,
   b) providing a punch comprising an external surface which is intended to shape an internal surface of the wall of the container,
   c) placing the punch within the die in a forming position in which a receiving space is defined between the internal surface of the die and the external surface of the punch, a deformable gob of glass extending partly within the receiving space, the punch being capable of being moved with respect to the die in a withdrawing movement between the forming position and a withdrawn position, a volume envelope being defined by the cumulative volume occupied by the punch between its forming and withdrawn positions,
   d) while keeping the gob of glass within the die and the punch in the forming position, the gob of glass which is deformed between an initial state having an initial volume and a subsequent state having a subsequent volume is cooled, the initial volume intercepting the volume envelope, and the subsequent volume not intercepting the volume envelope,
   e) extracting the punch.

2. The method according to claim 1, in which during stage c) the deformable gob of glass is inserted into the die, the punch is moved along an inward movement from an initial position to the forming position, thus forming the deformable gob of glass to partly expand the same within the receiving space.

3. The method according to claim 2, in which the initial position and the withdrawn position are the same.

4. The method according to claim 2, in which the inward and withdrawing movements follow opposite trajectories.

5. The method according to claim 1, in which the withdrawing movement is a movement of pure translation along a withdrawal axis.

6. The method according to claim 5 in which the die comprises a base and an opposite opening, in which the punch extends between a first extremity and a second opposite extremity along the withdrawal axis, the first extremity being located closer to the base of the die than the second extremity, in which in a transverse cross-sectional plane comprising the withdrawal axis the outer surface of the punch comprises a first point close to the first extremity and a second point at a distance from the first extremity, in which a distance from the first point to the withdrawal axis is greater than a distance from the second point to the withdrawal axis.

7. The method according to claim 6 in which the gob of glass has in both its initial volume and its subsequent volume an inner surface opposite the outer surface of the punch, the inner surface of the gob of glass having a first point associated with the first point on the outer surface of the punch and a second point associated with the second point on the outer surface of the punch and in which in the subsequent state a distance from the second point on the inner surface of the gob of glass to the withdrawal axis is greater than the distance from the first point on the outer surface of the punch to the withdrawal axis.

8. The method according to claim 7 in which the second point on the inner surface of the gob of glass is the closest point on the inner surface of the gob of glass in the said transverse cross-sectional plane to the withdrawal axis.

9. The method according to claim 1, in which in its initial state the gob of glass has an inner surface facing the outer surface of the punch and an outer surface opposite to the inner surface, the outer surface of the gob of glass facing the inner surface of the die, in which in stage d) the gob of glass is subjected to cooling which is differential between the inner surface and outer surface of the gob of glass.

10. The method according to claim 9, in which the outer surface of the gob of glass is cooled more than the inner surface.

11. The method according to claim 9, in which in stage d) the gob of glass is cooled in a controlled way so as to hold the outer surface of the gob of glass against the inner surface of the die.

12. The method according to claim 9, in which in stage d) the gob of glass is cooled in a controlled way so as to detach the inner surface of the gob of glass from the outer surface of the punch.

13. The method according to claim 12, in which in stage d) a gas is introduced between the inner surface of the gob of glass and the outer surface of the punch.

14. The method according to claim 13, wherein said gas is air.

15. The method according to claim 9, in which in stage d) the gob of glass is cooled by both the die and the punch.

16. The method according to claim 1, in which finishing operations are applied to produce a glass container.

17. The method according to claim 1, in which after extracting of the punch a step of blowing is applied to deform the wall.

18. The method according to claim 1, in which the container is filled with contents and the container is removably closed using a closure acting together with the container which can be alternately placed in a closed condition in which it prevents access to the contents and an open condition in which it permits such access.

19. The method according to claim 18, in which the container and the closure acting together with the container form an article, and in which finishing operations are applied to the article.

* * * * *